US007717131B2

(12) United States Patent
Creswell et al.

(10) Patent No.: US 7,717,131 B2
(45) Date of Patent: May 18, 2010

(54) DIVERTER VALVE

(75) Inventors: Robert S. Creswell, Grand Rapids, MI (US); Michael Zolnierek, Grandville, MI (US); Michael W. Regelbrugge, Rockford, MI (US); Jimmie D. Chrysler, Wyoming, MI (US)

(73) Assignee: Amerikam, Inc., Grand Rapids, MI (US)

( * ) Notice: Subject to any disclaimer, the term of this patent is extended or adjusted under 35 U.S.C. 154(b) by 689 days.

(21) Appl. No.: 10/595,281

(22) PCT Filed: Oct. 8, 2004

(86) PCT No.: PCT/US2004/033436

§ 371 (c)(1),
(2), (4) Date: Nov. 22, 2006

(87) PCT Pub. No.: WO2005/036037

PCT Pub. Date: Apr. 21, 2005

(65) Prior Publication Data

US 2007/0199599 A1 Aug. 30, 2007

Related U.S. Application Data

(60) Provisional application No. 60/481,499, filed on Oct. 10, 2003.

(51) Int. Cl.
*F16K 11/06* (2006.01)
(52) U.S. Cl. .................... 137/625.46; 137/801; 239/394
(58) Field of Classification Search ............ 137/625.17, 137/625.4, 625.46, 625.47, 801, 862; 239/25, 239/391, 394
See application file for complete search history.

(56) References Cited

U.S. PATENT DOCUMENTS

| | | | | | |
|---|---|---|---|---|---|
| 3,516,611 | A | * | 6/1970 | Piggott | 239/394 |
| 3,814,326 | A | * | 6/1974 | Bartlett | 239/394 |
| 3,850,351 | A | * | 11/1974 | Yoshihara | 239/393 |
| 4,498,611 | A | * | 2/1985 | Yoshihara | 222/599 |
| 4,534,512 | A | * | 8/1985 | Chow et al. | 239/394 |
| 4,577,785 | A | * | 3/1986 | Wakabayashi | 222/598 |
| 4,747,580 | A | * | 5/1988 | Tinnes et al. | 222/598 |
| 5,275,206 | A | * | 1/1994 | Acker | 137/625.46 |
| 5,520,216 | A | * | 5/1996 | d'Agostino et al. | 137/862 |
| 5,701,934 | A | | 12/1997 | Kuran et al. | |

(Continued)

FOREIGN PATENT DOCUMENTS

DE 3720207 A 12/1987

(Continued)

*Primary Examiner*—John Fox
(74) *Attorney, Agent, or Firm*—McGarry Bair PC

(57) ABSTRACT

A diverter valve (10) for selectively controlling the flow of fluid from a fluid source to one of several fluid outlets (132, 136) includes a fixed ceramic disk (14) fixed to a housing (12) and a rotating ceramic disk (16) retained in the housing against the fixed disk by a retainer (24). An accessory mount (20) is adhered to the rotating ceramic disk to facilitate connection to accessories and to direct fluid from the valve. Flow passages (88, 90, 104, 106, 108, 110, 112) in the disks cooperate with flow passages (54, 64, 66, 68) in the housing and flow passages (116, 118, 122) in the accessory mount to balance the pressure of fluid flow within the valve against the disks to minimize leaks and prolong durability.

6 Claims, 13 Drawing Sheets

U.S. PATENT DOCUMENTS

| | | | |
|---|---|---|---|
| 6,575,196 B1 * | 6/2003 | Creswell | 137/625.46 |
| 7,204,271 B2 * | 4/2007 | Kasai et al. | 137/625.46 |
| 7,314,062 B2 * | 1/2008 | Chen | 137/625.41 |

FOREIGN PATENT DOCUMENTS

| | | |
|---|---|---|
| EP | 0771980 A | 5/1997 |
| EP | 1096189 A | 5/2001 |
| EP | 1293712 A | 9/2003 |
| EP | 1342996 A | 9/2003 |

\* cited by examiner

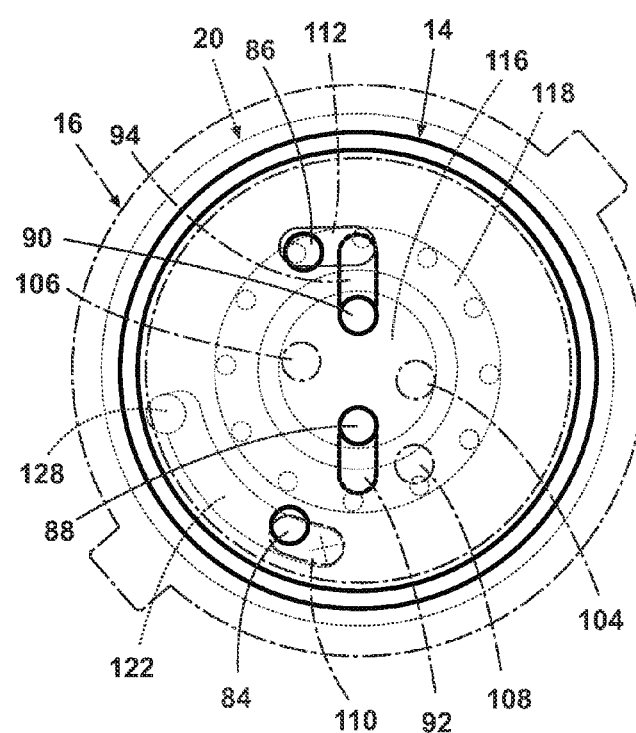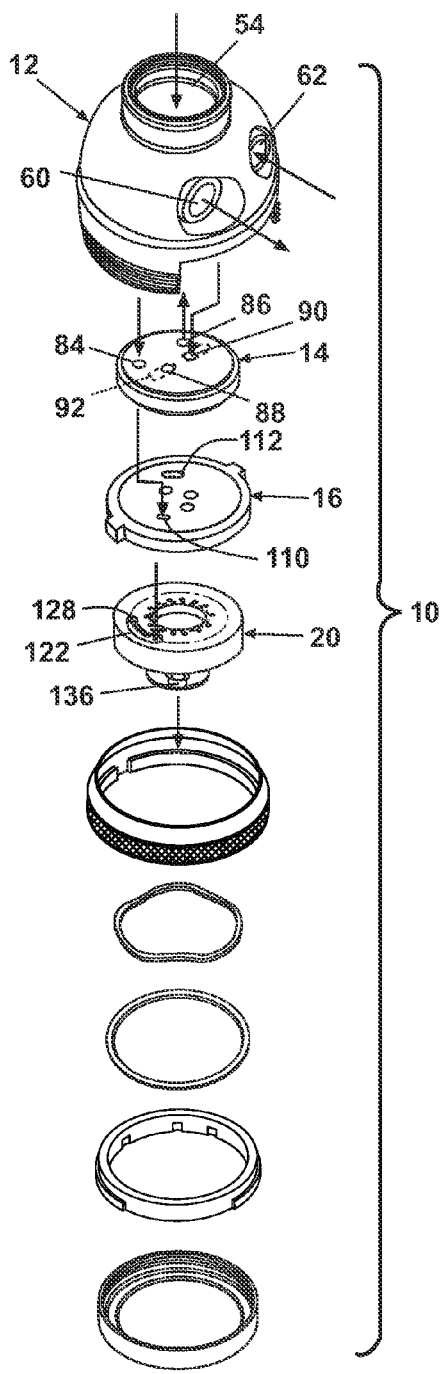
Fig. 12
Fig. 13

DIVERTER VALVE

CROSS REFERENCES TO RELATED APPLICATIONS

This application claims priority on International Application No. PCT/US2004/033436, filed Oct. 8, 2004, which claims the benefit of U.S. Provisional Patent Application 60/481,890, filed Oct. 10, 2003, both are incorporated herein in their entirety.

BACKGROUND OF THE INVENTION

1. Field of the Invention

The invention relates to a diverter valve that selectively diverts water from a conventional kitchen faucet to one of two or more outlets, and more particularly, to a diverter valve having ceramic disk elements.

2. Description of the Related Art

Fluid valves using ceramic valve stacks comprising a fixed ceramic disk and a rotating ceramic disk, both of which have pass-through openings to control the flow of fluid through the valve by selective movement of the rotatable ceramic disk, are well known. They typically appear in various configurations, such as in-line valves, conventional faucets, diverter valves, and hydrants, to name a few. Almost all ceramic valves comprise a "stack-up" that traditionally includes a seal, a fixed ceramic disk, a rotating ceramic disk, and a bearing in contact with the rotating ceramic disk. The stack-up is typically contained within a valve body, which defines the various inlets and outlets to the fluid sources.

For such a valve to work properly, the fixed and rotating ceramic disks must be held together in compression with force (the stack-up pressure) sufficient to prevent fluid from leaking between the interface of the disks. At the same time, the torque required to rotate the rotatable ceramic disk must be within a predetermined value, so that a user can easily use the device. The torque is the force that a user must supply to the handle of the valve (or to the valve itself) to rotate the rotating disk with respect to the fixed disk to turn the valve through its various operating positions. Although there is some subjectivity in the predetermined torque value, the force must always remain low enough to permit the weakest of users to easily operate the valve.

Commonly assigned U.S. Pat. No. RE35,545 discloses mounting a retainer to a positive stop in order to obtain a repeatable stack up pressure. Commonly assigned U.S. Pat. Nos. 6,405,756 and 6,575,196 disclose a means of reducing the stack up pressure. Normally, balancing the stack up pressure and torque is not a problem with these solutions, but in a valve with complex flows through the disks, e.g. a diverter valve, it has been found that uneven hydraulic pressures on the disks tend to cause leaks. Moreover, risk of leaks and higher costs attend existing diverter valves where flow must be directed from the rotatable ceramic through a lower housing.

Thus, there is a need for a ceramic diverter valve that balances hydraulic pressures within the ceramic disks, maintains a sufficiently low operating torque, and more reliably directs flow through the rotatable disk to the outlets.

SUMMARY OF THE INVENTION

The invention lies in a diverter valve for selectively controlling the flow of fluid from a fluid source to one of at least two fluid outlets. The valve comprises a housing defining at least one flow passage. A first ceramic plate mounts to the housing, fixed against rotation, and has at least one flow passage in registry with the housing flow passage. A second ceramic plate rotatably mounts within the housing, and has at least one flow passage that can be selectively placed into fluid communication with the housing flow passage. The diverter valve further has an accessory case adhered to the second ceramic plate. The accessory case has at least one flow passage in registry with the second ceramic plate flow passage. The flow passage in the accessory case is configured to mount a flow adapter.

Preferably, the accessory case is adhered to the second ceramic plate by an adhesive. Ideally, the adhesive is epoxy. Also, preferably, the accessory case mounts two flow adapters. One flow adapter is for aerated flow and a second flow adapter is for stream flow. In another aspect, the first ceramic plate is adhered to the housing.

In another aspect of the invention, the diverter valve has the flow passages in the housing and the accessory case configured and oriented to substantially balance hydraulic pressures acting on the ceramic plates. In one embodiment, a flow passage in the housing is open to and parallel with the first ceramic plate whereby pressure in the flow passage can act against the first ceramic plate to urge it toward the second ceramic plate.

In a further aspect of the invention, the diverter valve includes a thrust bearing and a retainer. The thrust bearing is disposed between the retainer and the second ceramic plate, and bears against the second ceramic plate with reduced friction to enable the second ceramic plate to rotate with lower torque. In one embodiment, the thrust bearing includes a wave spring and washer. In another embodiment, the thrust bearing is a low friction washer. Preferably the low friction washer comprises PTFE. And in a third embodiment, the thrust bearing is a roller bearing.

In another aspect, the first ceramic plate is adhered to the housing. And, the diverter valve has at least one ring seal between the first ceramic plate and the housing. Preferably it has three ring seals between the first ceramic plate and the housing. The ring seal can be seated within a groove. And, preferably, the groove is a dovetail groove.

BRIEF DESCRIPTION OF THE DRAWINGS

In the drawings:

FIG. 12 is a plan view of several components of the diverter valve of FIG. 1 in a first position where water entering the valve is diverted to a filter and returned to the valve where it exits the accessory mount.

FIG. 13 illustrates the water flow path through the valve in the first position.

DETAILED DESCRIPTION

Figure 1:
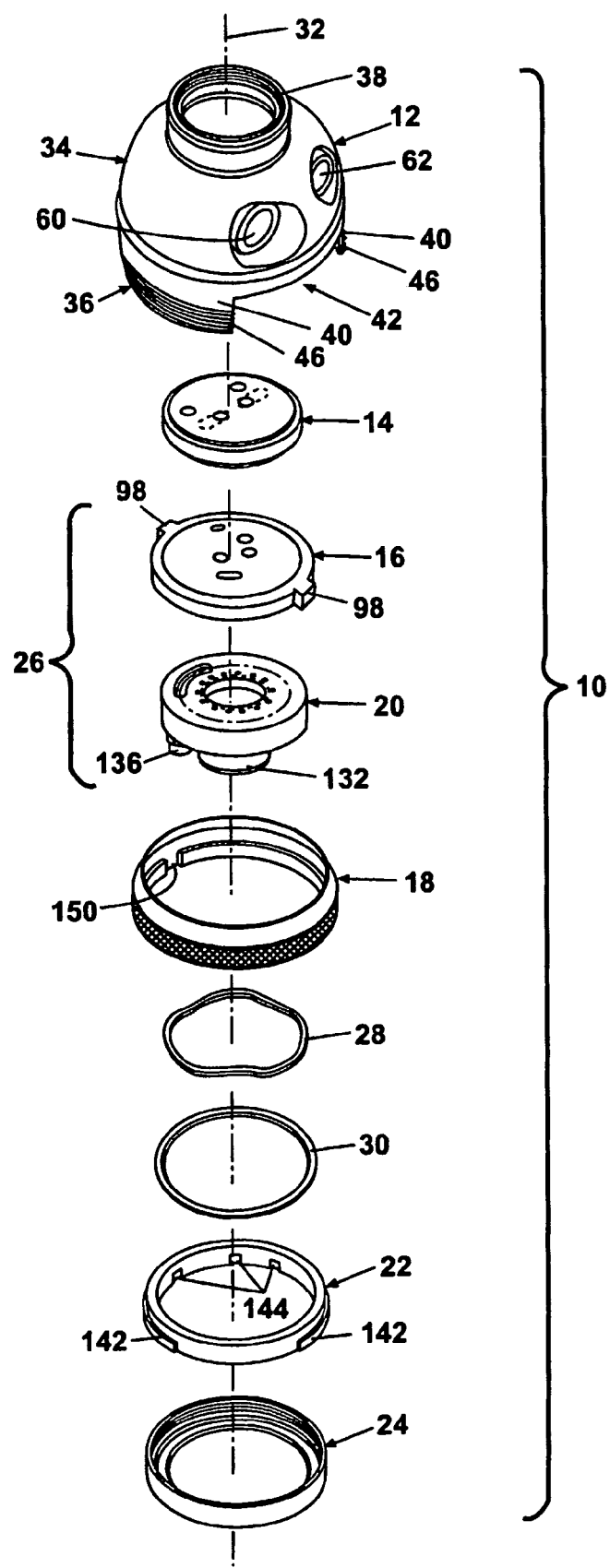
FIG. 1 is an exploded view of a diverter valve in accordance with the invention.
Figure 2:
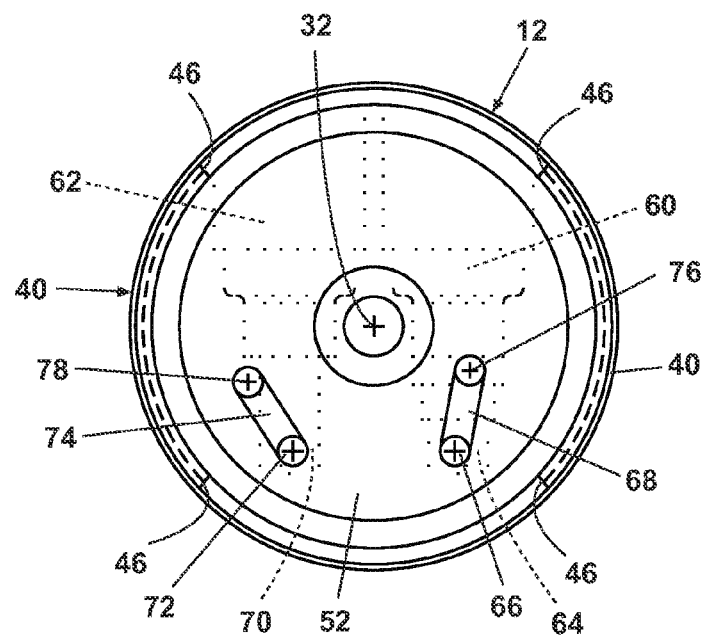
FIG. 2 is a bottom view of the housing of the diverter valve of FIG. 1.

FIG. 1 illustrates a valve 10 according to the invention. The valve 10 comprises basically a housing 12, a fixed ceramic plate or disk 14, and a rotating ceramic plate or disk 16, the rotation of which is controlled by a selection ring 18, an accessory mount 20, a detent case 22, and a retainer 24. As will be described in further detail later, the fixed ceramic disk 14 is fixed to the housing 12 against rotational movement, and the accessory mount 20 is adhered to the rotating ceramic disk 16. For convenience, the rotating ceramic disk/accessory mount assembly will sometimes be referred to as an outlet assembly 26. The retainer 24 retains the outlet assembly 26, the detent case 22, and the selection ring 18 in the housing 12. A wave spring 28 and a washer 30 facilitate sealing the valve and constitute a thrust bearing that maintains the rotating ceramic disk 16 against the fixed ceramic disk 14 while minimizing torque when the rotating ceramic disk 16 is rotated. It will be appreciated that this embodiment of a bearing is most suitable for uses where low fluid pressures will exist within the valve, typically below about 80 psi. Performance may degrade at higher pressures Referring now to FIGS. 1, 2, and 11, the housing 12 can be formed of metal, such as brass, or a suitable polymer, such as Polyoxymethylene, and has a roughly cylindrical shape with a longitudinal axis 32. An upper body portion 34 and a lower body portion 36 are aligned on the axis 32. A collar 38 projects from the upper body portion 34 and is also preferably aligned on the axis 32. The lower body portion 36 comprises a pair of oppositely disposed partial cylindrical walls 40 that define a cavity 42 that is open through a lower end 44 of the housing 12 and also through the axial edges 46 of the partial cylindrical walls 40. A stepped recess 48 in the cavity 42 is bounded by an annular wall 50 and a face 52 in the upper body portion 34. The stepped recess 48 forms a seat for the fixed disk 14. The outside of each partial cylindrical wall 40 adjacent the lower end 44 is threaded.

An inlet conduit 54 extends preferably along the axis 32 from the collar 38 through the face 52 and is adapted to fluidly connect to a source of water, such as from a faucet. The inlet conduit 54 has a flare portion 56 at the face 52. A filter inlet 60 and a filter outlet 62 comprise stepped openings parallel to each other on opposite sides of and not connected to the inlet conduit 54. The filter inlet 60 and a filter outlet 62 extend through a side of the upper body portion 34 and are sized and configured to accept standard fittings, such as John Guest® fittings, that will facilitate connection to a water filtration unit. The inner end 64 of the filter inlet 60 connects to a depending conduit 66 that terminates at a channel 68 in the face 52. Similarly, the inner end 70 of the filter outlet 62 connects to a depending conduit 72 that terminates at a channel 74 in the face 52. The channels 68, 74 are not parallel and extend from the conduits 66, 72 toward termination points 76, 78, respectively, that are somewhat closer to the longitudinal axis 32.

Figure 3:
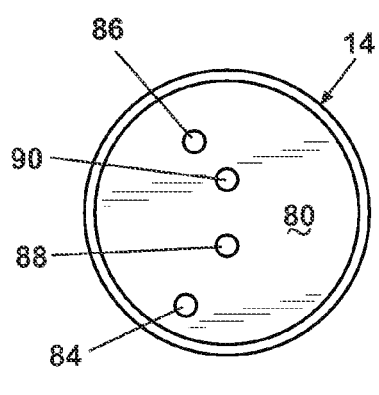
FIG. 3 is a top view of the fixed disk of the diverter valve of FIG. 1.
Figure 4:
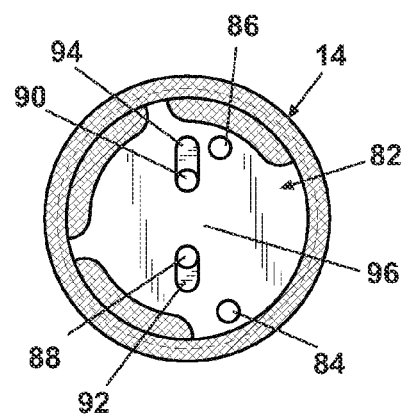
FIG. 4 is a bottom view of the fixed disk.

Referring now to FIGS. 1, 3, and 4, the fixed ceramic disk 14 is generally circular and has on one side an adhering face 80 and on the other side, a bearing face 82. Four pass through openings 84, 86, 88, and 90 extend through the disk 14 from the adhering face 80 to the bearing face 82. The disk 14 is sized to nest within the stepped recess 48, with the adhering face 80 adhered to the face 52 of the upper body portion 34. In one embodiment, the disk 14 is adhered to the face 52 using any suitable adhesive that will fix the disk to the upper body portion 34 permanently, and within a maximum temperature range to be found in the application to which the valve 10 is to be used. An example is an epoxy. It will be appreciated that this first embodiment, where the fixed ceramic disk 14 is adhered to the face 52 of the upper body portion 34, is preferable for uses where low fluid pressures will exist within the valve, typically below about 80 psi. Performance may degrade at higher pressures.

The opening 84 is positioned to be in registry with the termination point 78, and the opening 86 is positioned to be in registry with the termination point 76. Openings 88, 90 are positioned preferably along a diameter of the disk 14 to be within the flare portion 56 of the inlet conduit 54. Slots 92, 94 extend along the diameter of the disk 14 from the respective openings 88, 90 at the bearing face 82. The bearing face 82 comprises a smaller irregular contact surface 96 that might be formed by removing material from the bearing surface along its peripheral edges. The smaller contact surface 96 helps to reduce torque. As is conventional in ceramic disk valves, the contact surface 96 must be polished flat.

Figure 5:
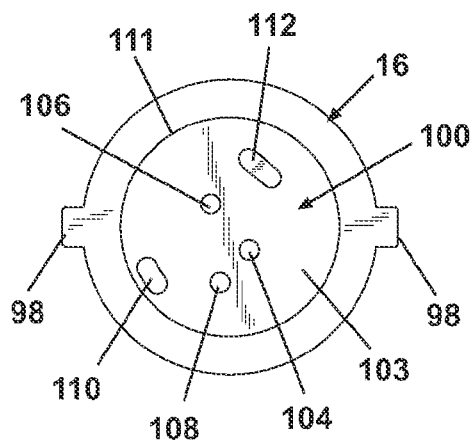
FIG. 5 is a top view of the rotating disk of the diverter valve of FIG. 1.
Figure 6:
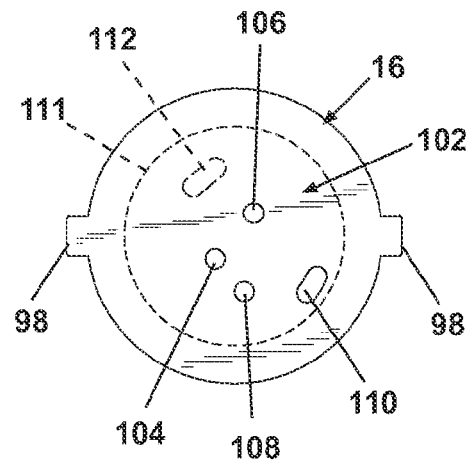
FIG. 6 is a bottom view of the rotating disk.

Referring now to FIGS. 1, 5, and 6, the rotating ceramic disk 16 has a generally circular shape from which extend keys 98. The rotating ceramic disk 16 has a larger diameter than the fixed ceramic disk 14 and includes a bearing face 100 on one side and an outlet face 102 on the other side. The bearing face 100 has a smaller diameter contact surface 103 that is polished flat and is of a size no smaller than the contact surface 96 of the fixed disk 14. The rotating ceramic disk 16 has four pass through openings and a blind slot in the contact surface 103. Two center openings 104, 106 are disposed on a diameter of the disk 16 and are spaced from each other to be in registry with the openings 88, 90 in a first position of the rotating disk 16 relative to the fixed disk 14. A spray opening 108 is positioned to be in registry with one of the slots 92, 94 in the fixed disk 14 in a second position of the rotating disk 16 relative to the fixed disk 14, when simultaneously, the two center openings 104, 106 will not be in registry with the openings 88, 90. An elongated filter opening 110 is positioned near the perimeter 111 of the contact surface 103 to be in registry with opening 86 in the fixed disk 14 in a third position of the rotating disk 16 relative to the fixed disk 14. An elongated blind slot 112 is sized and positioned within the contact surface 103 to place the opening 84 into fluid communication with the slot 92 (both on the fixed disk 14) at the same time that the elongated filter opening 110 is in registry with the opening 86.

Figure 7:
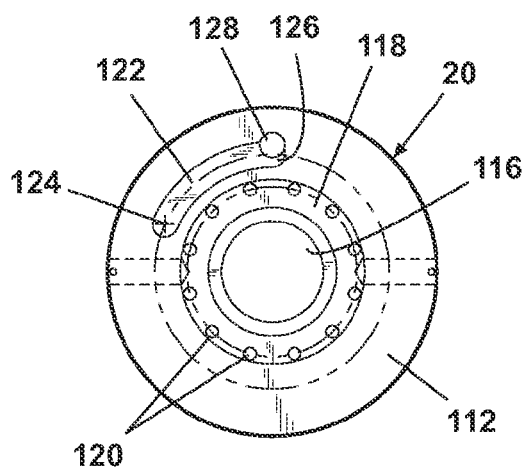
FIG. 7 is a top view of the accessory mount of the diverter valve of FIG. 1.
Figure 8:
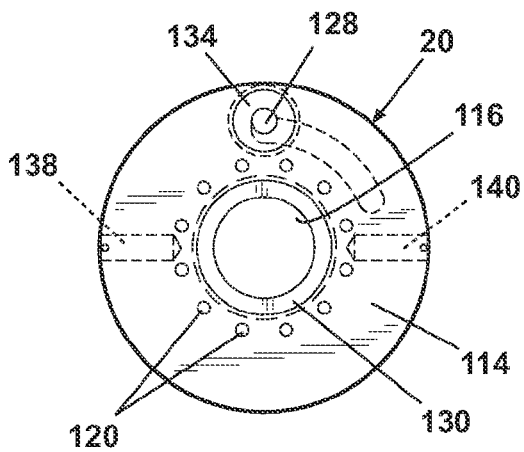
FIG. 8 is a bottom view of the accessory mount.

Looking now at FIGS. 1, 7 and 8, the accessory mount 20 is a disk preferably formed of metal, such as brass, or a suitable polymer, such as Polyoxymethylene, and has an adhering surface 113 and an opposite outlet surface 114. The accessory mount 20 need not be formed of the same material as the housing 12, although for economic or aesthetic reasons, it may be preferable to do so. The adhering surface 113 is adapted to be fixed to the outlet face 102 of the rotating ceramic disk 16. Preferably the accessory mount 20 is adhered to the outlet face 102 using any suitable adhesive that will fix the adhering surface 112 to the outlet face 102 permanently, and within a maximum temperature range to be found in the application to which the valve 10 is to be used. An example is an epoxy.

The accessory mount 20 has a center aperture 116 that is sized to encompass the two center openings 104, 106 in the rotating ceramic disk 16. An annular groove 118, spaced outwardly from the center aperture 116 is positioned to fluidly communicate with the spray opening 108. A plurality of spray openings 120 extends from the groove 118 to the outlet surface 114, surrounding the center aperture 116. An annular blind slot 122 extends through an arc of less than 90° from a first end 124 to a second end 126. At the second end 126, a filter outlet opening 128 extends through the accessory mount 20 to the outlet surface 114. At the outlet surface 114, the center aperture 116 has an internally threaded bore 130 adapted to receive a conventional aerator 132. Similarly, the filter outlet opening 128 has an internally threaded bore 134 adapted to receive a laminator 136.

The accessory mount 20 also has two bores 138, 140 extending inwardly along a diameter. The bores 138, 140 are adapted to receive springs and balls (not shown) for the purpose of interacting with the detent case 22. As can be seen in FIG. 1, the detent case 22 is a ring that has a pair of outwardly extending flanges 142, sized and spaced to fit closely between the partial cylindrical walls 40. The internal diameter of the detent case 22 is nominally larger than the diameter of the accessory mount 20; enough to enable the accessory mount to rotate freely within the detent case. A number of detents 144 are provided in an interior wall of the detent case, each detent corresponding to one of the first, second or third positions of the rotating ceramic disk 16 relative to the fixed ceramic disk 14. Typically, the detent case will be made of self-lubricated material such as Delrin®.

Figure 9:
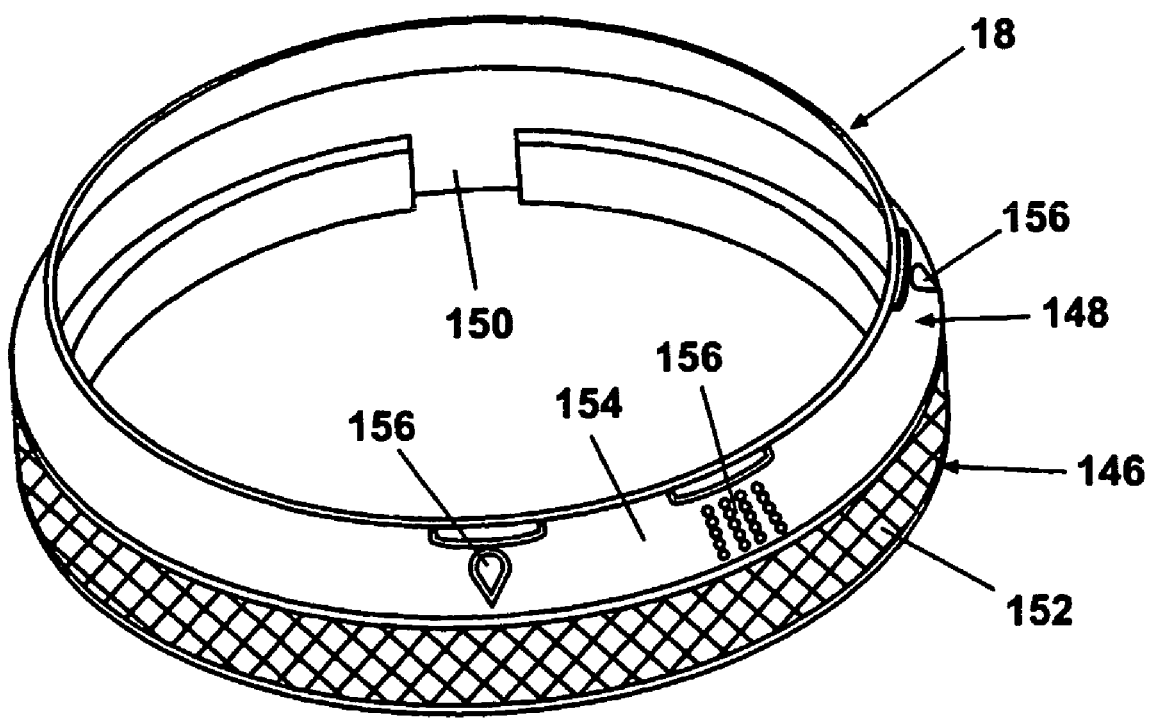
FIG. 9 is an enlarged view of the selection ring.

Looking now at FIGS. 1 and 9, the selection ring 18 comprises an outer collar 146 and an inwardly directed annular lip 148 in which are formed diametrically opposing key holes 150, sized to receive the keys 98 of the rotating ceramic disk 16 when the valve 10 is assembled. The diameter of the selection ring 18 is nominally larger than the outside diameter of the partial cylindrical walls 40; enough to enable the selection ring 18 to rotate freely around the partial cylindrical walls 40. The outer collar 146 has a knurled portion 152 and an indicia portion 154. The knurled portion 152 enables a user to grasp the selection ring 18 and manually rotate the rotatable ceramic disk 16 to one of the predetermined first, second and third positions. Visible indicia 156 on the indicia portion 154 correspond to each of the first, second and third positions so a user can easily determine where and in which direction to rotate the selection ring to obtain a particular one of the first, second and third positions.

Figure 10:
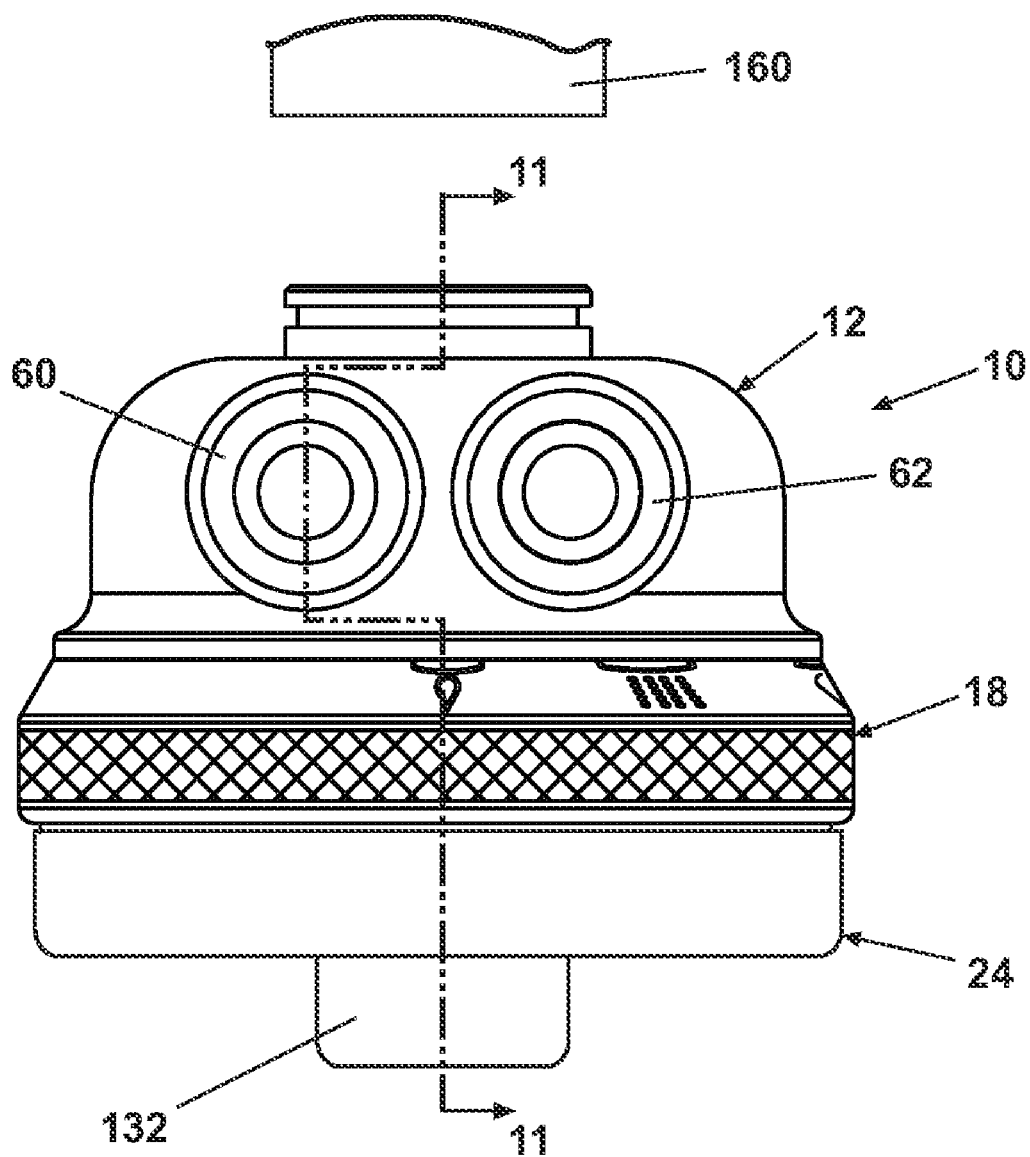
FIG. 10 is a side view of the diverter valve of FIG. 1.
Figure 11:
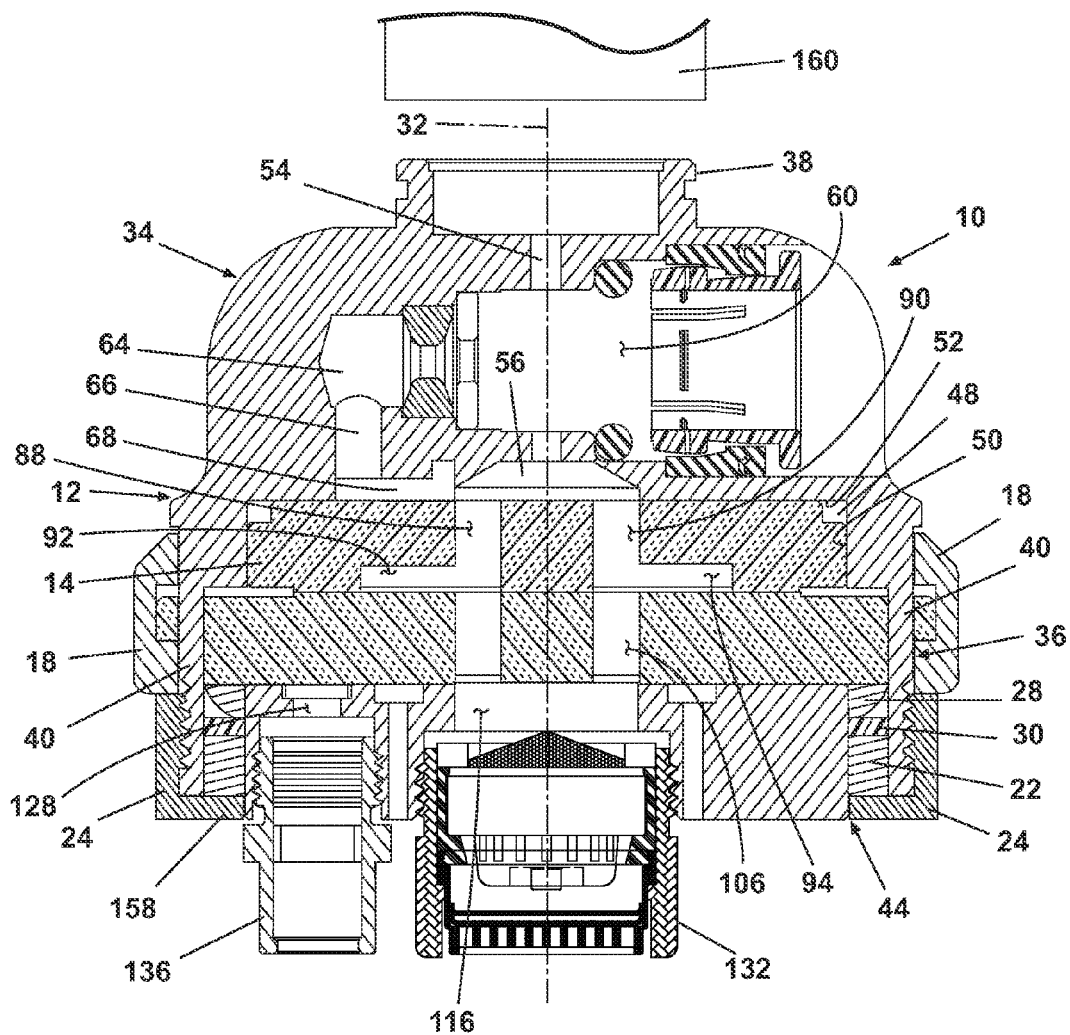
FIG. 11 is a cross sectional view of the diverter valve of FIG. 10 taken along line 11-11.

Referring to FIGS. 1, 10 and 11, the assembly of the valve 10 will be described in detail. Initially, it should be noted that the particular sequence of the assembly as described here is only one of the many possible combinations for assembling the valve. Many of the various ways to assemble the valve are equally preferred. Therefore, the described assembly of the valve is only meant to better describe the interfitting of the various valve elements and is not meant to limit the valve assembly to the described sequence.

The outlet assembly 26 is positioned within the cavity 42 so that the contact surface of the rotating ceramic disk bears against the contact surface of the fixed ceramic disk, with the keys extending between the partial cylindrical walls 40. It will be apparent that the outlet assembly 26 is thus rotatable relative to the fixed ceramic disk 14 within a range limited by the keys' freedom of movement between the axial edges 46 that effectively function as stops. The selector ring 18 is disposed over the partial cylindrical walls 40 until the key holes 150 receive the keys 98. The wave spring 28 is then placed over the accessory mount 20 to bear against the rotating ceramic disk 16. The washer 30, preferably Polyoxymethylene, is then placed over the accessory mount 20 to bear against the wave spring 28. Lubricity is important in order to minimize torque on the rotating disk 14, so it will be appreciated that the wave spring 28 provides finite contact points at the rotating disk and the washer where friction occurs.

The detent case 22 is then positioned over the accessory mount 20 to bear against the washer 30 with the extending flanges 142 disposed between the partial cylindrical walls 40, thus fixing the detent case relative to the housing 12. Finally, the retainer 24 is threaded onto the external threads of the partial cylindrical walls 40. The retainer 24 has an internally directed flange 158 that bears against the detent case 22, which, in turn places pressure on the washer 31, wave spring 28 and the rotating ceramic disk 16 against the fixed ceramic disk 14 to establish the stack up pressure. Preferably, the retainer (or the housing) has a stop that will positively position the retainer on the housing at a predetermined position as described and claimed in U.S. Pat. No. RE35,545. Outlet adapters, such as the aforementioned aerator 132 and laminator 136 can be attached to the accessory mount 20 as desired. It will be understood that the axis of rotation of the outlet assembly 26 is the longitudinal axis 32.

To use the valve 10, an adapter 160 can be mounted to the collar 38. The adapter 160 enables the valve 10 to be mounted to a conventional faucet, such as a kitchen faucet, so that water coming from the kitchen faucet will enter the inlet conduit 54. Also, the filter inlet 60 and filter outlet 62 will connect to a water filtration unit, preferably using conventional John Guest® fittings. With this assembly, the valve 10 is secured to the faucet so it will not rotate, yet the torque required to rotate the selection ring 18 is low enough so that the user can easily rotate it, and also nowhere near enough to cause the valve to rotate relative to the faucet. Preferably, the torque is 5 inch-lbs. or less.

Operation of the valve 10 will be described with respect to FIGS. 12-17. FIGS. 12 and 13 illustrate the relative positions of the housing face 52, fixed ceramic disk 14, rotating ceramic disk 16, and accessory mount 20 when the outlet assembly 26 is in the first position, including the fluid flow path through the valve 10. In this position, water flows from the faucet to the filtration unit (not shown), returns from the filtration unit, and is directed to the filter outlet opening 128. For illustrative purposes, FIG. 11 shows some of the components in phantom with a view looking down through the valve 10.

In the first position, water enters the inlet conduit 54 from the faucet where it passes through the flare portion 56 and into the pass through openings 88, 90 of the fixed disk 14. Opening 88 is blocked by the contact surface of the rotating ceramic disk 14, but opening 90 is in fluid communication with the elongated blind slot 112 by way of the slot 94. Consequently, water flows through the blind slot 112 to the opening 86, which is in registry with the termination point 76. Water continues to flow through channel 68 to conduit 66, then to the filter inlet 60 and to the filtration unit (not shown). Water exiting the filtration unit enters the valve 10 through the filter outlet 62, then into the depending conduit 72, through channel 74 and to the termination point 78. Here, water flows through the termination point 78 which is in registry with opening 84, and which in turn by the position of the outlet assembly 26, is in registry with the elongated filter opening 110 of the rotating ceramic disk 16. Simultaneously, water passing through the elongated filter opening 110 enters the annular blind slot 122 of the accessory mount, there to exit the valve 10 through the filer outlet opening 128. Preferably, the flow of filtered water is laminated through the laminator 136.

Figures 14, 15:
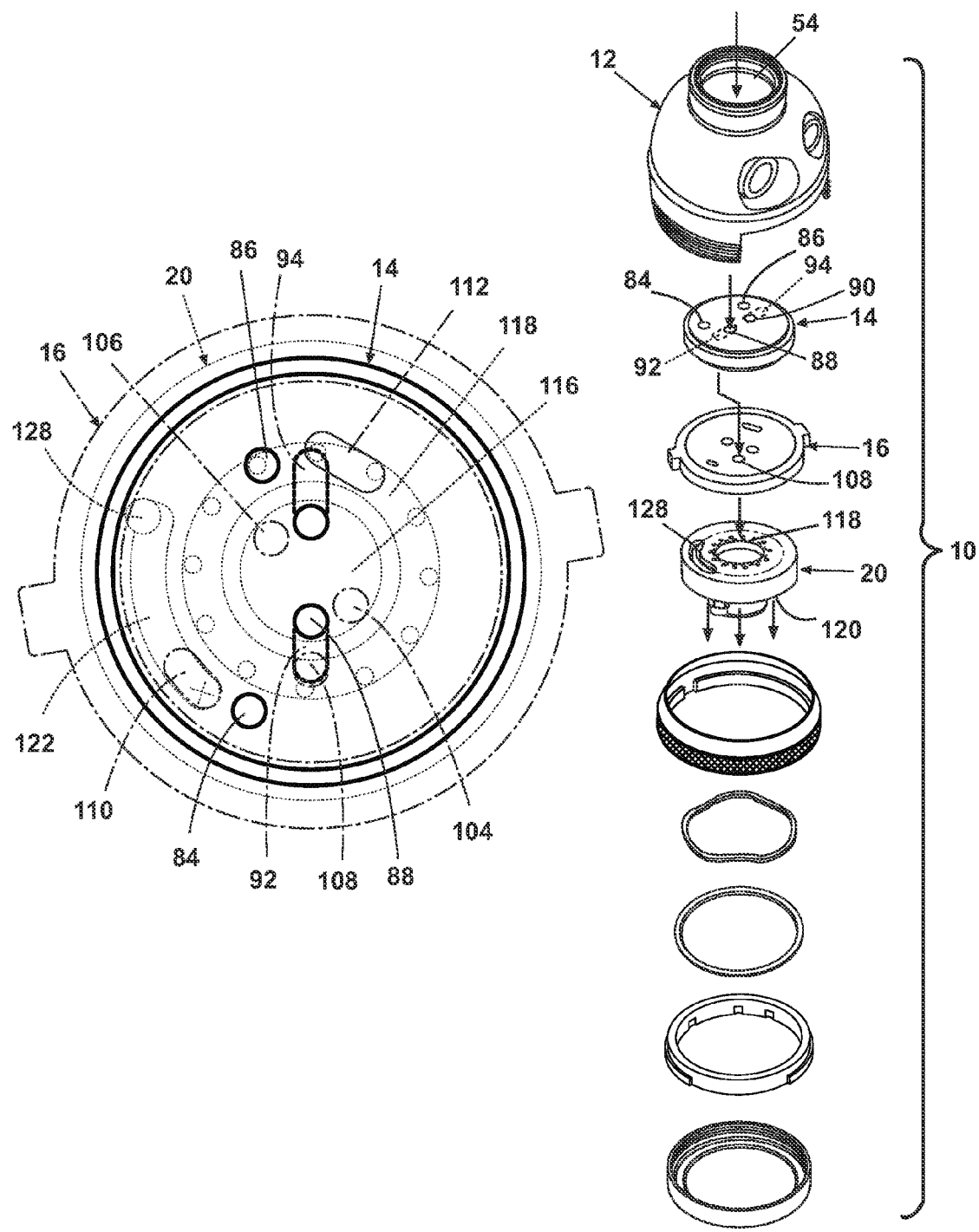
FIG. 14 is a plan view of several components of the diverter valve of FIG. 1 in a second position where water entering the valve is diverted to a spray outlet as it exits the accessory mount.
FIG. 15 illustrates the water flow path through the valve in the second position.

FIGS. 14 and 15 illustrate the relative positions of the components in the second position. In the second position, water enters the inlet conduit 54 from the faucet where it passes through the flare portion 56 and into the pass through openings 88, 90 of the fixed disk 14. Opening 90 is blocked by the contact surface of the rotating ceramic disk 14, but opening 88 is in fluid communication with the spray opening 108 by way of the slot 92. Simultaneously, water is blocked from entry into the filter inlet 60 of the housing 12 and from entry into the center openings 104, 106 of the rotating disk 16. Water flow through the spray opening 108 and into the groove 118 in the accessory mount 20 where it exits in a spray through the spray openings 120.

Figures 16, 17:
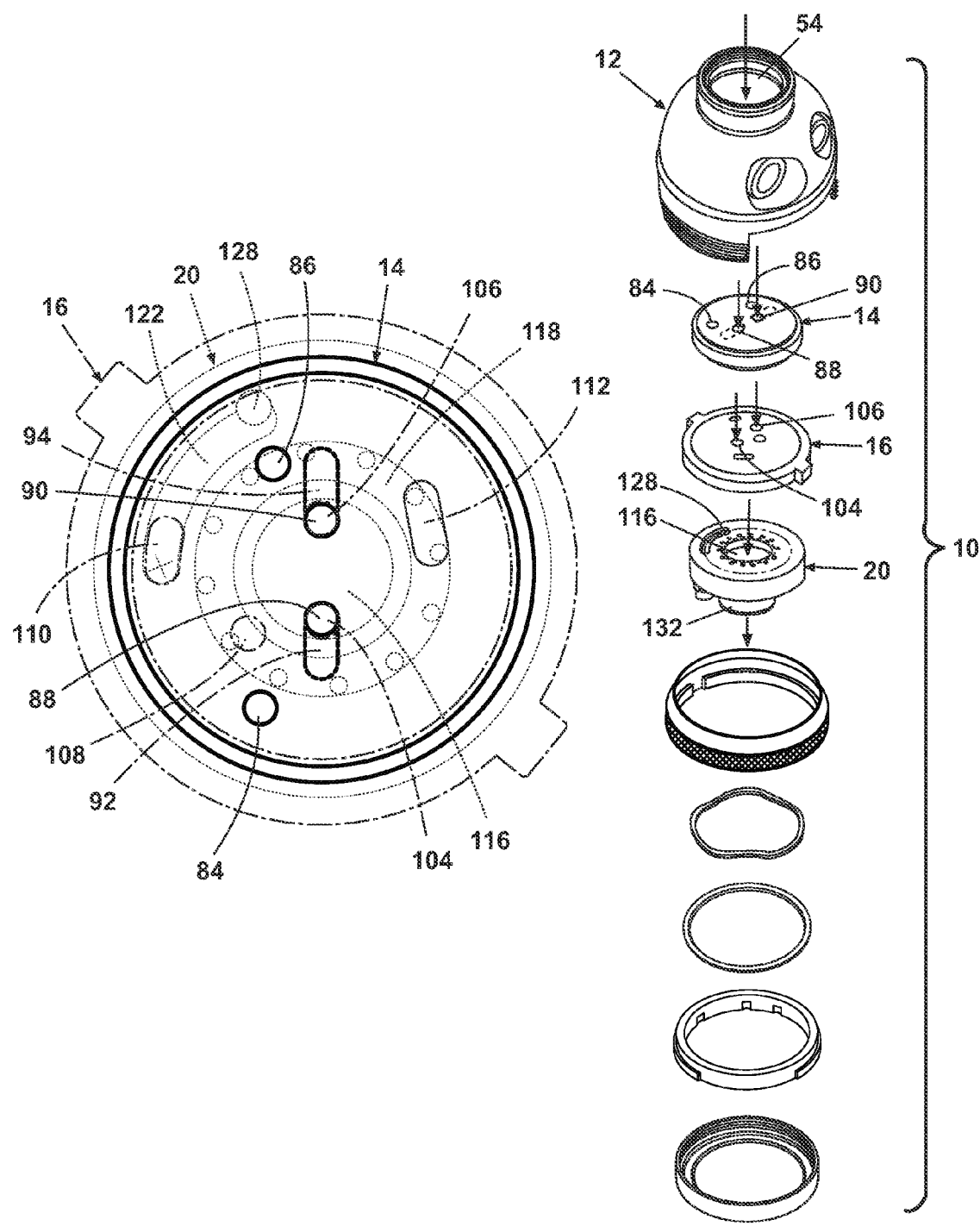
FIG. 16 is a plan view of several components of the diverter valve of FIG. 1 in a third position where water entering the valve is diverted to an aerator as it exits the accessory mount.
FIG. 17 illustrates the water flow path through the valve in the third position.

FIGS. 16 and 17 illustrate the relative positions of the components in the third position. In the third position, water enters the inlet conduit 54 from the faucet where it passes through the flare portion 56 and into the pass through openings 88, 90 of the fixed disk 14. Since the pass through openings 88, 90 are in registry with the two center openings 104 and 106, water passes through the rotating ceramic disk 16 and out through the center aperture 116 in the accessory mount 20, which is also in registry with the center openings 104 and 106. Preferably, this flow of unfiltered water is aerated through the aerator 132.

Figure 18:
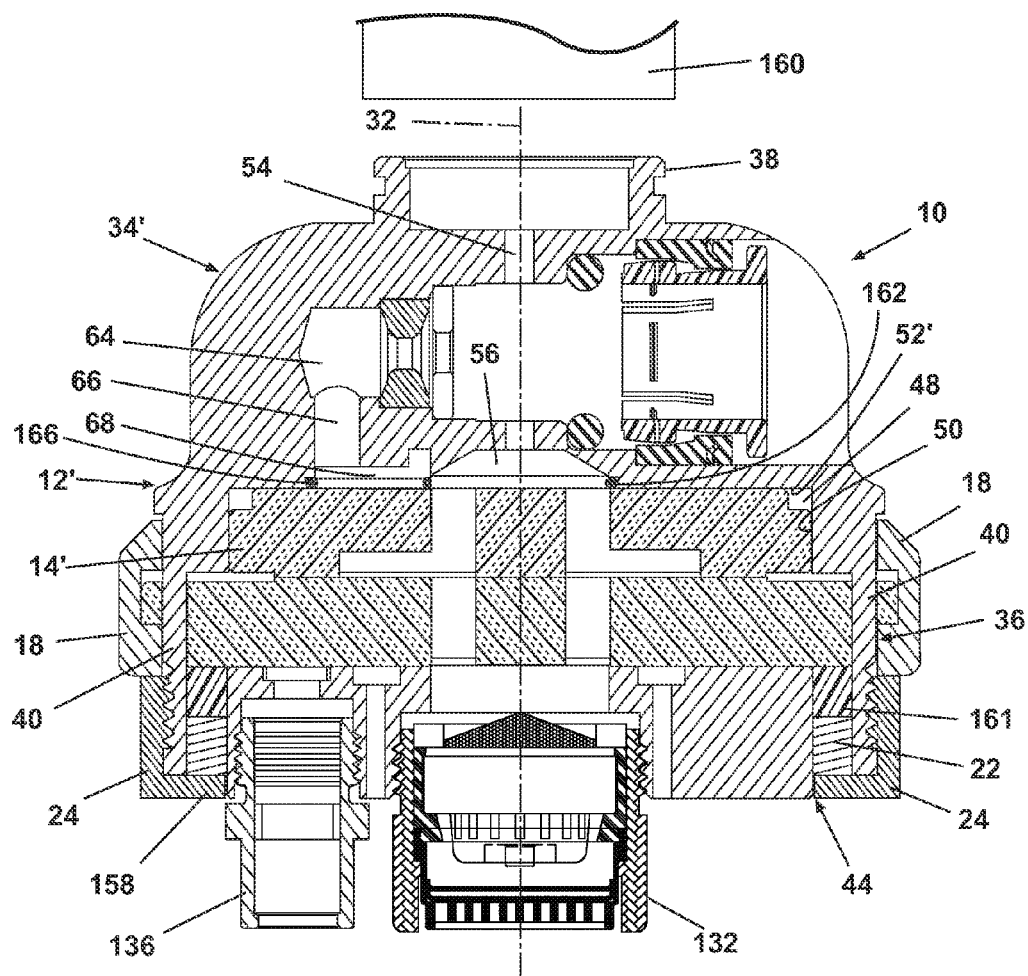
FIG. 18 is a cross sectional view, similar to FIG. 11, of a second embodiment of the diverter valve according to the invention.
Figure 19:
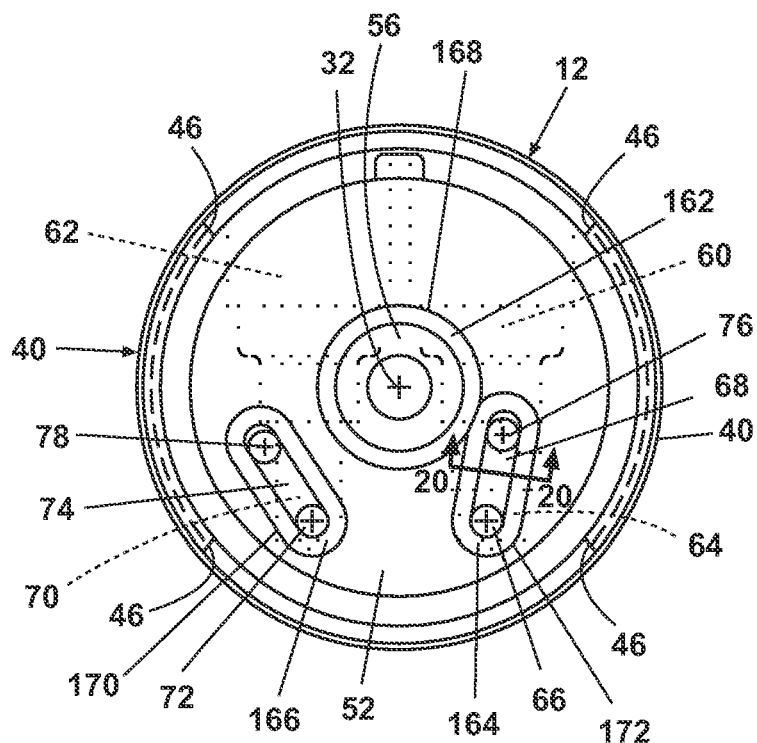
FIG. 19 is a bottom view, similar to FIG. 2, of the housing of the second embodiment of the diverter valve.
Figure 20:
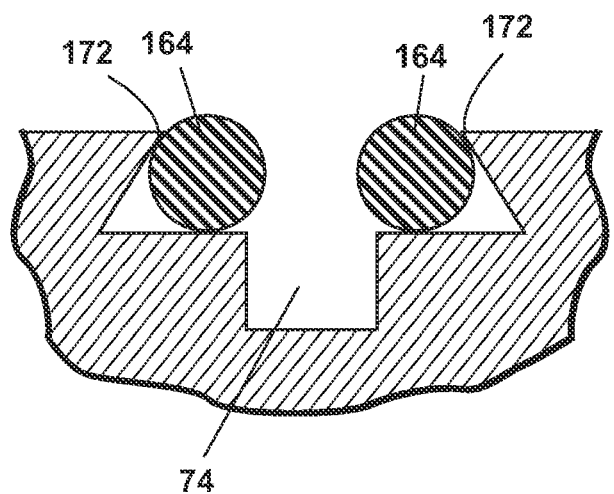
FIG. 20 is cross sectional view taken along line 19-19 of FIG. 18 with an O-ring installed.

Key elements of a second embodiment of a diverter valve according to the invention are shown in FIGS. 18-20. Looking first at FIG. 18, it can be seen that the second embodiment is in all respects identical to the first embodiment (where like parts bear like numerals) except that (1) the fixed disk 14' is not adhered to the housing 12', (2) grooves and sealing rings are disposed in the face 52' of the upper body portion 34', and (3) instead of the wave spring 28 and washer, the thrust bearing comprises a thrust washer 161. The second embodiment is particularly appropriate where higher fluid input pressures exist, e.g. above about 80 psi. In such case, a wave spring would not normally be sufficient to keep the rotating disk fluidly tight against the fixed disk.

In this embodiment, the thrust washer 161 will preferably be formed of Teflon®-filled Delrin®, and sized to permit the retainer 24 to securely hold the rotating disk 16 against the fixed disk 14'. The thrust washer 161 should be friction reducing, and its composition can be adjusted accordingly. For example, a Delrin® thrust washer with PTFE will have a lower coefficient of friction than one without PTFE. The fixed disk 14' is sealed against the face 52' by sealing rings 162, 164, and 166. The size, shape and disposition of the sealing rings 162, 164, and 166 are selected to minimize torque as the rotating disk 16 is rotated relative to the fixed disk 14'. For example, each sealing ring can be circular in cross section and 0.070 inches in diameter. Alternatively, one or more sealing rings can be oblong or obround and have a varying diameter, e.g., where the ends are circular in cross section and where the sides are higher than wide.

Looking now at FIGS. 19 and 20, the sealing rings 162, 164, and 166 are disposed, respectively in grooves 168, 170, and 172 in the face 52' of the upper body portion 34'. The groove 168 is formed at the periphery of the flare portion 56; the groove 170 is formed at the periphery of the channel 74; and the groove 172 is formed at the periphery of the channel 66. Preferably, at least a portion of each groove 162, 164, and 166 is dovetailed (see FIG. 20) to provide additional space for the sealing rings to deform when they are compressed by the fixed disk 14' and by water pressure in the adjacent channel. For example, the groove along the sides of the channel might not be dovetailed but the groove at the ends of the channel may be dovetailed. In a preferred embodiment, the grooves 162, 164, and 166 are countersunk approximately 0.050 inches. Also, a notch 174 is formed in the upper body portion 34' to accommodate a tab (not shown) on the fixed disk 14' so that the fixed disk can be properly aligned relative to the housing 12' and fixed against rotation.

Operation of the second embodiment is otherwise identical to operation of the first embodiment. In this embodiment, however, the fixed disk 14' has some limited freedom to move axially relative to the housing 12'. Thus, when hydraulic pressure in the housing passages 66, 68, 72, 74, and/or 56 is elevated, e.g. on the order of 190 psi or so, the pressure tends to urge the fixed disk toward the rotating disk 16, which in turn generates force on the thrust washer 161. The sealing rings maintain a seal between the fixed disk 14' and the housing face 52', but it may also be advisable to provide a PTFE washer (not shown) between the thrust washer 161 and the detent case 22 in order to maintain sufficiently low torque.

Figure 21:
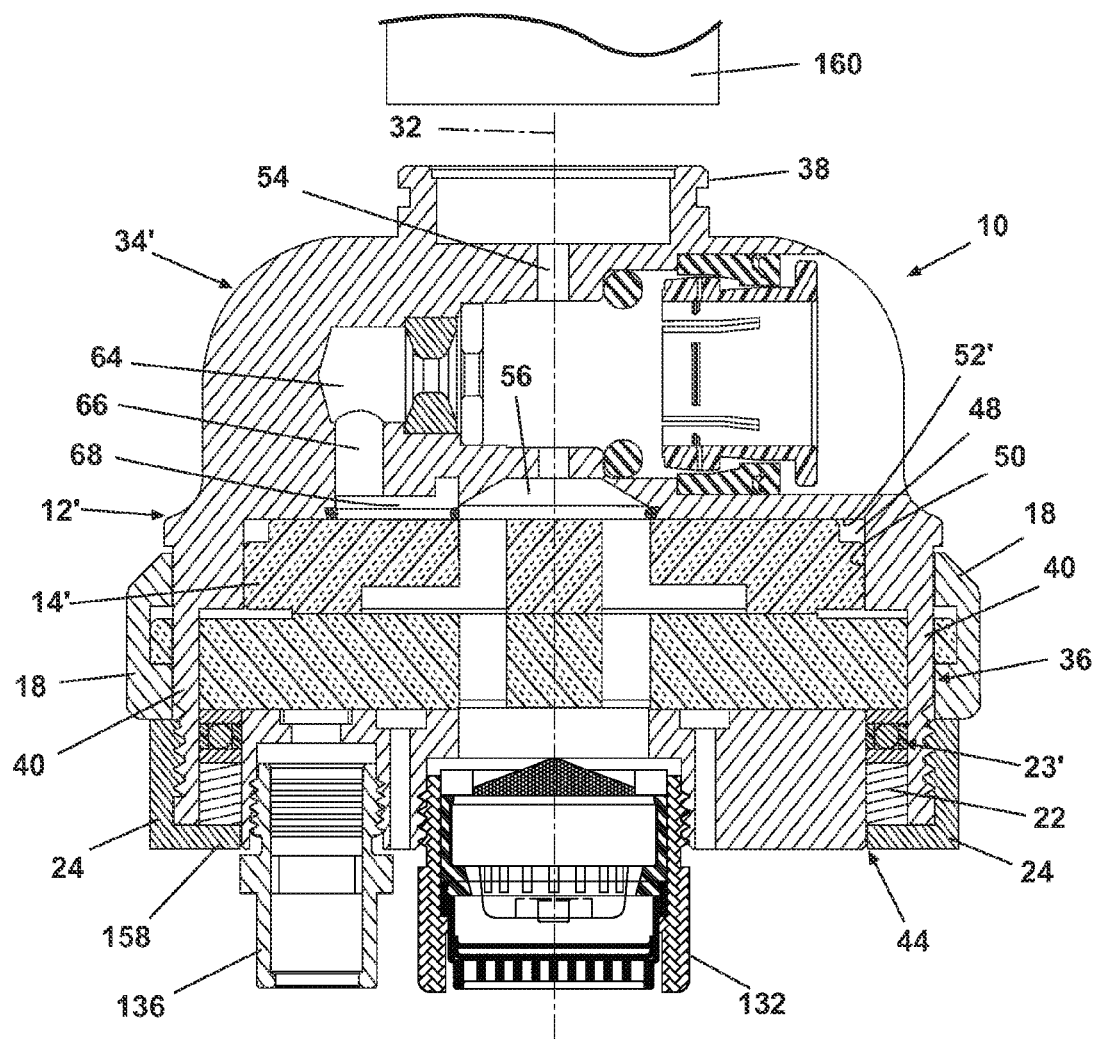
FIG. 21 is a cross sectional view, similar to FIGS. 11 and 18, of a third embodiment of a diverter valve according to the invention.
Figure 22:
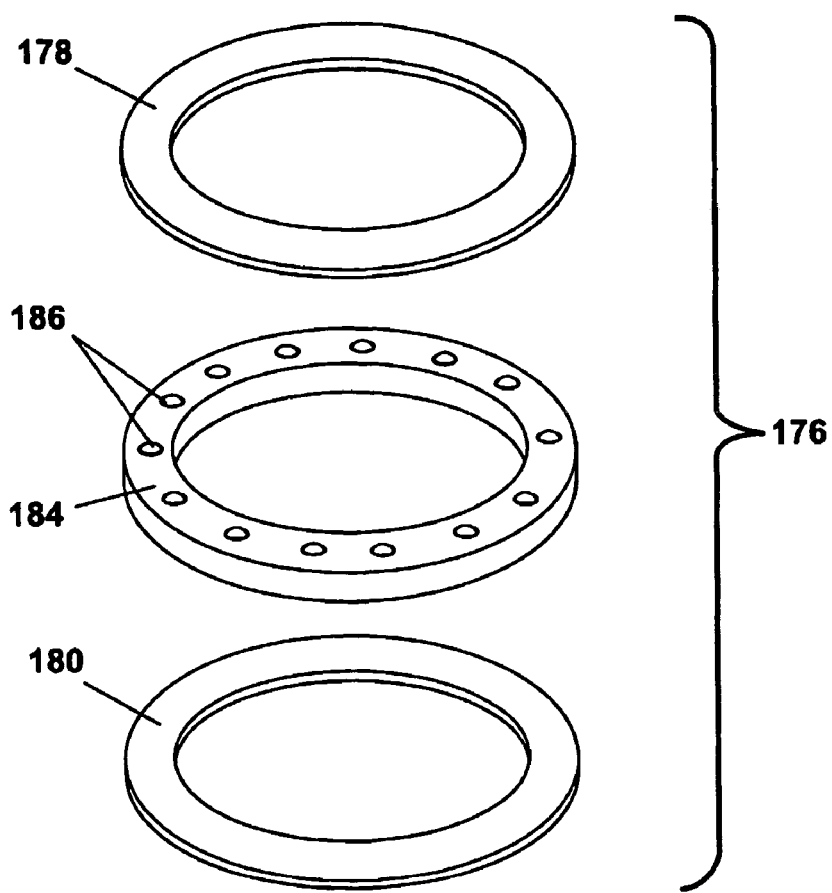
FIG. 22 is an exploded isometric view of the thrust bearing of FIG. 21.
Figure 23:
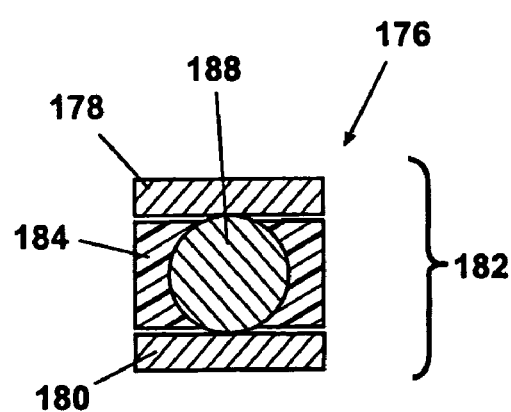
FIG. 23 is a cross sectional view of the thrust bearing of FIG. 22, taken along line 23-23.

Looking now at FIGS. 21-23, it can be seen that a third embodiment of the diverter valve 10 is in all respects identical to the second embodiment (where like parts bear like numerals), except that the thrust bearing 23' is a roller bearing 176. It is to be understood that the thrust bearing of the third embodiment can also be used equally effectively in the first embodiment.

The roller bearing 176 comprises two flat rings, an upper ring 178 and a lower ring 180, disposed coaxially and spaced from each other to define a race 182 between them. The rings 178, 180 are preferably formed of steel, although any material having a hard, non-wearable surface will suffice. Within the race 182 is a self-lubricated ring 184, preferably formed of Delrin®, having a plurality of apertures 186 spaced evenly about the ring, and having a thickness less than the thickness of the race. The walls of each aperture 186 are spherically arcuate with a radius centered in the middle of the aperture. A roller ball 188, preferably formed of steel or other hard material, and having a radius slightly less than the radius of the aperture, is disposed in each aperture 186 and rotatable freely therein. There are at least 8 balls, and preferably 16. The upper ring 178 bears against the rotating ceramic disk 16. The lower ring 180 bears against the detent case 22. The balls 188 are held firmly within the race 182, between the upper 178 and lower 180 rings, and maintained in special relationship to one another by the Delrin ring 184. The Delrin ring 184, having a thickness less than the race 182, does not contact either the upper 178 or lower 180 ring. The thrust bearing, being part of the stack-up, is held with predetermined force between the detent case 22 and the rotating disk 16 by the retainer 24. As the rotating disk 16 is rotated by actuation of the selection ring 18, it causes the upper ring 178 to rotate with it. As it does, the balls 188 in the race 182 are urged to roll between the lower 180 and upper 178 rings with minimal resistance. Consequently, the torque required to move the rotating disk 16 is very low.

While the invention has been specifically described in connection with certain specific embodiments thereof, it is to be understood that this is by way of illustration and not of limitation, and the scope of the appended claims should be construed as broadly as the prior art will permit.

What is claimed is:

1. A diverter valve for selectively controlling the flow of fluid from a fluid source to one of at least two fluid outlets, the valve comprising:
    a housing defining at least one flow passage;
    a first ceramic plate mounted to the housing and fixed against rotation, the first ceramic plate having at least one flow passage in registry with the housing flow passage; and
    a second ceramic plate rotatably mounted within the housing, the second ceramic plate having at least one flow passage that can be selectively placed into fluid communication with the housing flow passage; and
    an accessory case adhered to the second ceramic plate, the accessory case having at least one flow passage in registry with the at least one second ceramic plate flow passage, wherein the at least one flow passage in the accessory case is configured to mount a flow adapter.

2. The diverter valve of claim 1 wherein the accessory case is adhered to the second ceramic plate by an adhesive.

3. The diverter valve of claim 2 wherein the adhesive is epoxy.

4. The diverter valve of claim 1 wherein the accessory case mounts two flow adapters.

5. The diverter valve of claim 4 wherein one flow adapter is for aerated flow and a second flow adapter is for stream flow.

6. The diverter valve of claim 1 wherein the first ceramic plate is adhered to the housing.

* * * * *

UNITED STATES PATENT AND TRADEMARK OFFICE
CERTIFICATE OF CORRECTION

| | | |
|---|---|---|
| PATENT NO. | : 7,717,131 B2 | Page 1 of 1 |
| APPLICATION NO. | : 10/595281 | |
| DATED | : May 18, 2010 | |
| INVENTOR(S) | : Creswell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 542 days.

Signed and Sealed this
Fifteenth Day of March, 2011

David J. Kappos
*Director of the United States Patent and Trademark Office*